United States Patent
Tokushima (10) Patent No.: US 6,466,360 B2
(45) Date of Patent: Oct. 15, 2002

(54) PHOTONIC CRYSTAL AND ITS FABRICATION

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/011,444

(22) Filed: Dec. 4, 2001

(65) Prior Publication Data

US 2002/0051275 A1 May 2, 2002

Related U.S. Application Data

(62) Division of application No. 09/591,581, filed on Jun. 9, 2000, now Pat. No. 6,366,392.

(30) Foreign Application Priority Data

Jun. 9, 1999 (JP) .......................................... 11-162897

(51) Int. Cl.⁷ .......................... G02F 1/00; G02F 1/295; H01S 5/00; G02B 6/10; H01L 21/00; H01L 21/82
(52) U.S. Cl. ...................... 359/321; 359/322; 372/45; 385/4; 385/129; 438/31; 438/689
(58) Field of Search ...................... 216/2, 24; 359/321, 359/322; 372/39, 43, 45; 385/4, 10, 129, 131, 132; 438/31, 689, 696

(56) References Cited

U.S. PATENT DOCUMENTS

| 5,600,483 A | * | 2/1997 | Fan et al. .................... 359/344 |
| 5,784,400 A | * | 7/1998 | Joannopoulos et al. ........ 372/96 |
| 5,955,749 A | * | 9/1999 | Joannopoulos et al. ........ 257/98 |
| 5,987,208 A | * | 11/1999 | Gruning et al. ............. 385/146 |
| 5,990,850 A | * | 11/1999 | Brown et al. ............... 343/912 |
| 5,999,308 A | * | 12/1999 | Nelson et al. .............. 359/321 |
| 6,058,127 A | * | 5/2000 | Joannopoulos et al. ........ 372/92 |
| 6,366,292 B1 | * | 4/2002 | Tokushima .................. 359/321 |
| 2001/0019565 A1 | * | 9/2001 | Iwasaki et al. ............. 372/39 |
| 2001/0020373 A1 | * | 9/2001 | Borrelli et al. ............. 65/393 |
| 2002/0036299 A1 | * | 3/2002 | Young et al. ............... 257/184 |
| 2002/0051275 A1 | * | 5/2002 | Tokushima .................. 359/241 |

FOREIGN PATENT DOCUMENTS

JP 2000-66002 A1 * 3/2000 ............ G02B/1/02

OTHER PUBLICATIONS

"Low–Loss Silicon–on–Insulator Photonic Crystal Waveguides", Arentoft et al., Elec. Let., vol. 38, No. 6, pp. 274–275 (Mar. 2002).*
"IR Photonic Crystals Fabricated Using Deep X–Ray Lithography", S. Bain, SPIE OE Reports, No. 169, pp. 1–3 (Jan. 1998).*
"Semiconductor Micro Resonators", Solid State Physics (Japan) vol. 32, No. 11, pp. 859–869, (1997).*
"Photonic Crystals–Molding the Flow of Light", Joannopoulos et al., Princeton University Press, pp. 124–125 (1995).*

* cited by examiner

Primary Examiner—Hung Xuan Dang
Assistant Examiner—David N. Spector
(74) Attorney, Agent, or Firm—Hayes Soloway P.C.

(57) ABSTRACT

A photonic crystal comprises a plurality of elongated elements formed of a first dielectric material and arranged in a two-dimensional periodic honeycomb lattice. A second dielectric material surrounds the elongated elements and extending between them. The second dielectric material defines between the elongated elements a plurality of spaces filled with a third dielectric material. The first dielectric material has permittivity that is greater than permittivity of the second dielectric material and permittivity of the third dielectric material.

6 Claims, 5 Drawing Sheets

PHOTONIC CRYSTAL AND ITS FABRICATION

CROSS-REFERENCE TO RELATED APPLICATION(S)

This is a division of application Ser. No. 09/591,581, filed Jun. 9, 2000, now U.S. Pat. No. 6,366,392.

BACKGROUND OF THE INVENTION

1. Field of the Invention

The present invention relates to photonic crystals and methods for fabricating photonic crystals.

2. Description of the Related Art

Photonic crystals are of great interest in the field of photonics because certain types of photonic crystals exhibit a photonic bandgap. The photonic bandgap defines a range of frequencies at which electromagnetic wave is not permitted to propagate it.

Different types of photonic crystals are proposed and tabulated on page 862 in Baba, "Semiconductor Micro Resonators and Control of Natural Emission", Solid State Physics (Japanese), vol. 32, No. 11, 1997, pages 859–869.

The typical photonic crystal is a spatially periodic structure. One well-known photonic crystal exhibits two-dimensional periodicity in which multiple elongated, e.g. cylindrical, elements made of a dielectric material are in a two-dimensional periodic pattern with their longitudinal axes parallel to each other.

Figure 6:
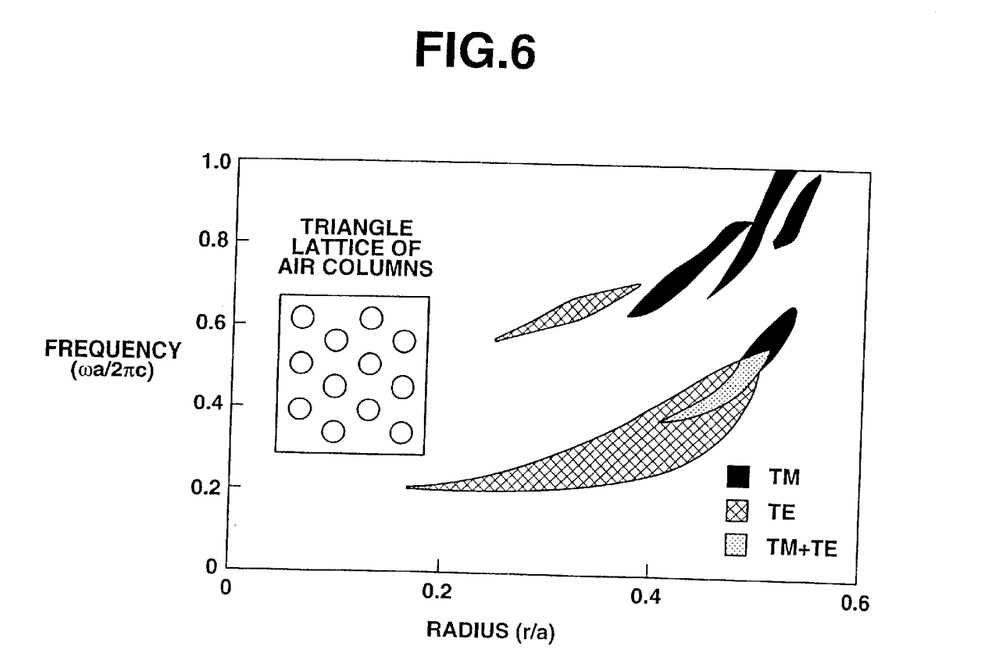
FIG. 6 is a photonic bandgap map for a triangular lattice of air columns drilled in a dielectric medium.

Joannopoulos et al., "Molding the Flow of Light" Photonic Crystals pages 124–125, discuss the case of elongated elements in the form of air columns in dielectric along with a photonic bandgap map for a triangular lattice of air columns drilled in a dielectric medium having permittivity 11.4. FIG. 6 of the accompanying drawings illustrates this photonic bandgap map. It also considers "honeycomb lattice" along with a photonic bandgap map for this structure. This photonic bandgap map is presented in FIG. 7 of the accompanying drawings.

Referring to FIG. 6, the photonic bandgap map for triangular lattice of air columns clearly indicates that for r/a around 0.45, the triangular lattice of air columns possesses a complete band gap for TE polarization and TM polarization for frequencies around $0.45(2\pi c/a)$, where r is a radius of air column, a is a lattice constant, c is the speed of light. A complete band gap of the triangular lattice of air columns occurs at a diameter of d=0.95a, at a midgap frequency of $\omega a/2\pi c=0.48$, where $\omega$ is angular frequency. Thus, this structure has very thin dielectric veins of width 0.05a between the air columns. To fabricate such a structure with a photonic bandgap at $\gamma=1.5$ $\mu$m would require a minimum feature size of 0.035 $\mu$m, where $\gamma$ is a wavelength. Such fine feature size may be fabricated, but this is very difficult.

Figure 7:
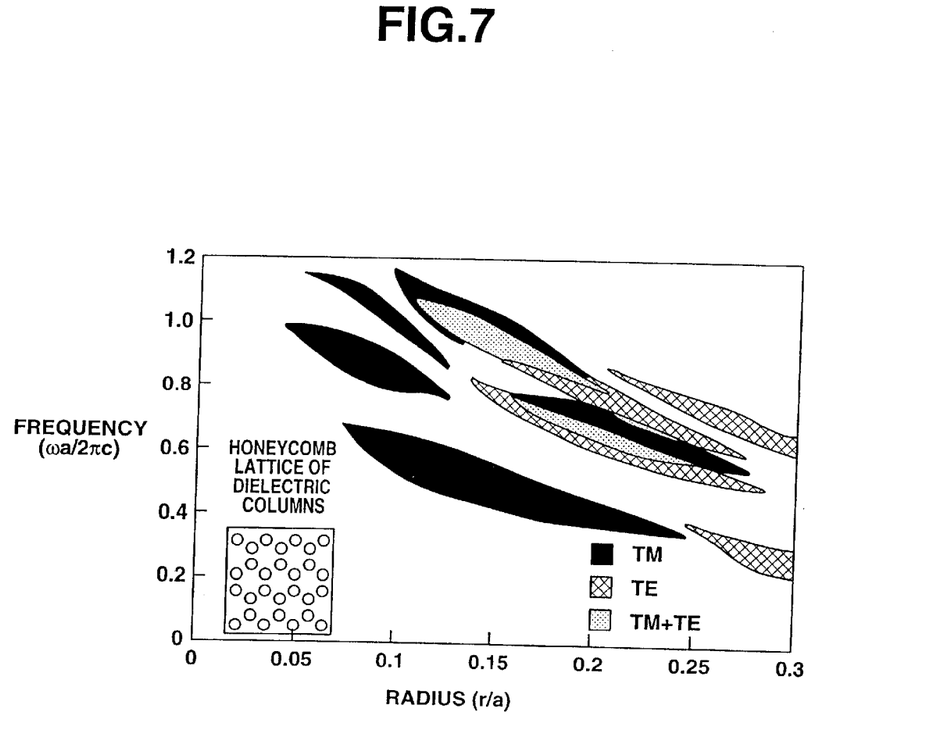
FIG. 7 is a photonic bandgap map for a honeycomb lattice of dielectric columns.

Referring to FIG. 7, the photonic bandgap map for honeycomb lattice of dielectric columns clearly shows a large overlap of photonic bandgaps for TH and TE polarizations, around r/a=0.14 and $\omega a/2\pi c \sim 1$, which is of much larger extent than the complete band gap of the triangular lattice.

To fabricate such a structure with a photonic bandgap at $\gamma=1.5$ $\mu$m would require a feature size of 0.45 $\mu$m. The production of such two-dimensional honeycomb lattice is less difficult to fabricate.

An object of the present invention is to strengthen such a lattice structure having a complete band gap, i.e., an overlap of photonic bandgaps for TH and TE polarizations.

Another object of the present invention is to provide a method of fabricating a structurally strengthened lattice, which is suited for mass production.

SUMMARY OF THE INVENTION

According to one exemplary implementation of the invention, there is provided a photonic crystal comprising:

a plurality of elongated elements formed of a first dielectric material and arranged in a two-dimensional periodic honeycomb lattice; and a second dielectric material surrounding said plurality of elongated elements and extending between said plurality of first elements, said second dielectric material defining between said elongated elements a plurality of spaces filled with a third dielectric material, said first dielectric material having permittivity that is greater than permittivity of said second dielectric material and permittivity of said third dielectric material.

According to another exemplary implementation of the invention, there is provided a method of fabricating a photonic crystal, comprising:

providing a substrate;

forming within said substrate a plurality of elongated elements of a first dielectric material in a two-dimensional periodic honeycomb lattice;

forming a layer of a second dielectric material over said substrate to a thickness such that said second dielectric material continuously extend between said plurality of elongated elements, said second dielectric material having permittivity less than permittivity of said first dielectric material.

According to other exemplary implementation of the invention, there is provided a method of fabricating a photonic crystal, comprising:

providing a dielectric substrate;

oxidizing said substrate inwardly to define a plurality of elongated elements within said substrate; and controlling the depth of oxidation of said substrate to determine dimensions of each of said plurality of elongated elements.

According to a specific aspect of the invention, there is provided a method of fabricating a photonic crystal, comprising;

providing a substrate;

forming elongated bores within said substrate in triangular lattice; and oxidizing said substrate inwardly to define a plurality of elongated elements within said substrate until a portion of said substrate on a line segment interconnecting centers of the adjacent two of said bores is completely oxidized.

BRIEF DESCRIPTION OF THE DRAWINGS

The foregoing and other objects, features and advantages of the invention will be apparent from the following more particular description of exemplary embodiments of the invention as illustrated in the accompanying drawings in which like reference characters refer to the same parts throughout the different views. The drawings are not necessarily scale, emphasis instead being placed upon illustrating the principles of the invention.

FIGS. 3A-1 to 3C-1 are schematic cross-sectional illustrations showing fabrication steps used to produce a photonic crystal, illustrating a third implementation of the invention.

FIGS. 3A-2 to 3C-2 are schematic top views showing the fabrication steps of FIGS. 3A-1 to 3C-1, respectively.

FIGS. 4A-1 to 4C-1 are schematic cross-sectional illustrations showing fabrication steps used to produce a photonic crystal, illustrating a fourth implementation of the invention.

FIGS. 4A-2 to 4C-2 are schematic top views showing the fabrication steps of FIGS. 4A-1 to 4C-1, respectively.

DESCRIPTION OF THE PREFERRED EMBODIMENT

[First Implementation of the Invention]

Figure 1:
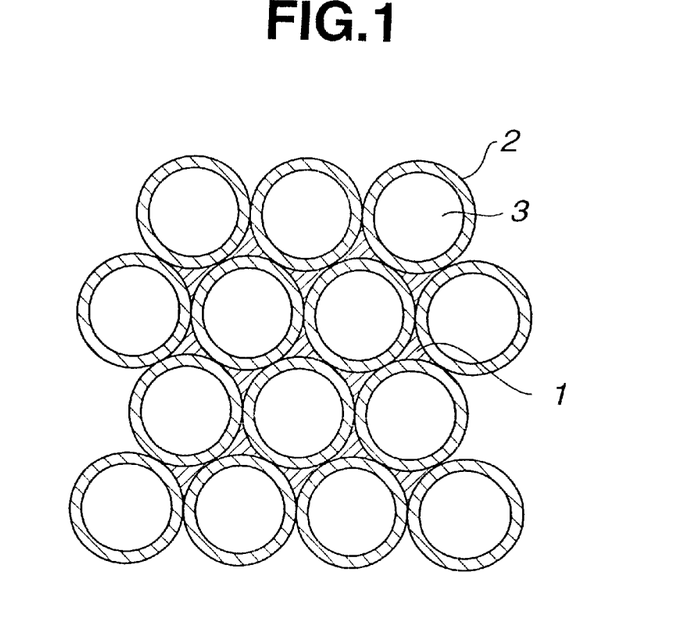
FIG. 1 is a schematic top view of a first implementation of the invention comprising a photonic crystal configured in two-dimensional periodic structure.

FIG. 1 is a schematic top view of an exemplary implementation of the two-dimensional photonic crystal of the invention. The structure includes a plurality of elongated first elements 1 formed of a first dielectric material. It is noted that the term "element or elements" as used herein is intended to encompass, without limitation, bores or spaces which may be filled with fluids or solids such as air and/or other gas, liquid or solid material. The elements 1 extend in parallel to one another. A longitudinal axis, not shown, extends through the center of each element 1 in the vertical or z-direction. The elements 1 are arranged periodically in two dimensions (x, y) in a plane generally orthogonal to the longitudinal axes extending through the elements 1.

The elements 1 are generally triangularly shaped, each having a generally triangular cross sectional profile throughout its longitudinal axis, and extending in a two-dimensional periodic arrangement relative to the x-y plane or any plane parallel thereto. The elements 1 are periodically arranged to provide a honeycomb lattice. The elements 1 can be simply regions of air or can include any other substantially dielectric solid, fluid (liquid or gas) or gel material. Although generally triangular elements are described in connection with FIG. 1, triangular or cylindrical elements or any shaped elongated elements may be employed without departing from the scope of the invention.

A second dielectric material 2 surrounds each of the plurality of elongated elements 1 and extends between the elements 1. The second dielectric material 2 defines between the elongated elements 1 a plurality of spaces or bores filled with a third dielectric material 3. It should be noted that different shadings is used on FIG. 1 to distinguish between the first and second materials and that the third dielectric material is not shaded.

The permittivity $\epsilon 1$ of the first dielectric material 1 is greater than the permittivity $\epsilon 2$ of the second dielectric material 2 and the permittivity $\epsilon 3$ of the third dielectric material 3. The permittivity $\epsilon 2$ of the second dielectric material 2 is greater than the permittivity $\epsilon 3$ of the third dielectric material 3. This relation can be expressed as $\epsilon 1 > \epsilon 2 > \epsilon 3$.

FIG. 1 schematically illustrates a two-dimensional periodic arrangement of bores that are filled with the third dielectric material 3. In the embodiment shown, each of the bores 3 is circular in cross sectional configuration. The two dimensional periodic arrangement of the bores 3 is a triangular lattice with lattice constant a, which represents the distance between centers of the bores 3. As shown in FIG. 1, each of the elements 1 is located within a triangle defined by the bores 3. This arrangement of the elements 1 produces a two-dimensional periodic honeycomb lattice.

In this embodiment, each of the elements 1 is a rod of solid 25 material. The rods 1 are surrounded or covered by the second solid dielectric material 2 that extends between the rods 1. This arrangement of the second solid dielectric material 2 produces a considerable increase in strength in honeycomb lattice structure of the rods 1 as compared to the conventional honeycomb lattice of rods. According to the conventional honeycomb lattice, the rods are spaced with all the spacing material completely removed.

As shown in FIG. 1, each of the elements 1 has a generally triangular cross sectional configuration having three sides.

The cross sectional configuration of each element 1 is not limited to the illustrated example of general triangle. The cross sectional configuration of each element 1 may take any other desired shape. The cross sectional configuration of each bore 3 is circular in this embodiment. But it may take any other desired shape.

It will be appreciated by those skill in the art that dielectric structures tend to have both transverse-electric (TE) guided modes and transverse-magnetic (TM) guided modes. TE modes are defined in a uniform dielectric slab as the modes for which the electric field is polarized parallel to the slab. TM modes are defined in a uniform dielectric slab as the modes for which the magnetic field is polarized parallel to the slab. In the case of a non-uniform dielectric slab, the modes are not purely TE or purely TM, but rather quasi-TE or quasi-TM.

The lattice structure of the elongated elements 1 have dimensions, which are proportioned such that the structure defines a complete photonic bandgap (PBG) at a range of frequencies such that electric field at such frequencies having a polarization parallel to a plane orthogonal to the longitudinal axes of the elongated elements 1 (TE modes) and magnetic field at such frequencies having a polarization parallel to of the plane are prevented from propagating within the periodic lattice structure. The photonic crystal shown in FIG. 1 has combined performance superiority of honeycomb lattice of the elongated elements 1 with structural superiority of triangular lattice of bores 3. The honeycomb lattice structure provides a wider range of frequencies over a complete PBG (see the dotted area TM+TE in FIG. 7) than a range of frequencies over a complete PBG (see the dotted area TM+TE in FIG. 6) provided by the triangular lattice structure. The triangular lattice structure is robuster than the honeycomb lattice structure.

Each element 1 of the photonic crystal that was actually made was formed of Si having dielectric constant of 11.9 and had a generally triangular cross sectional profile having three sides each having 0.4 $\mu$m in length. As the second dielectric material 2, $SiO_2$ with a dielectric constant of 3.1 was used. A layer of $SiO_2$ with a thickness 0.1 $\mu$m covered the elongated elements 1. The third dielectric material 3 was air having a dielectric constant of 1.

The elements 11 of $SiO_2$ was arranged in the two-dimensional honeycomb lattice pattern having a lattice constant a of 1.55 $\mu$m to produce a complete PBG to forbid the propagation of incident of light with a wavelength of 1.55

μm. The honeycomb lattice constant is the distance between centers of the adjacent two bores 3.

The engagement of $SiO_2$ with Si is firmer than the engagement of $SiO_2$ with GaAs. Thus, this firm engagement of the second dielectric material 2 with the elongated elements 1 makes at least partial contribution to increased structural strength of the photonic crystal of the invention.

[Second Implementation of the Invention]

Figure 2:
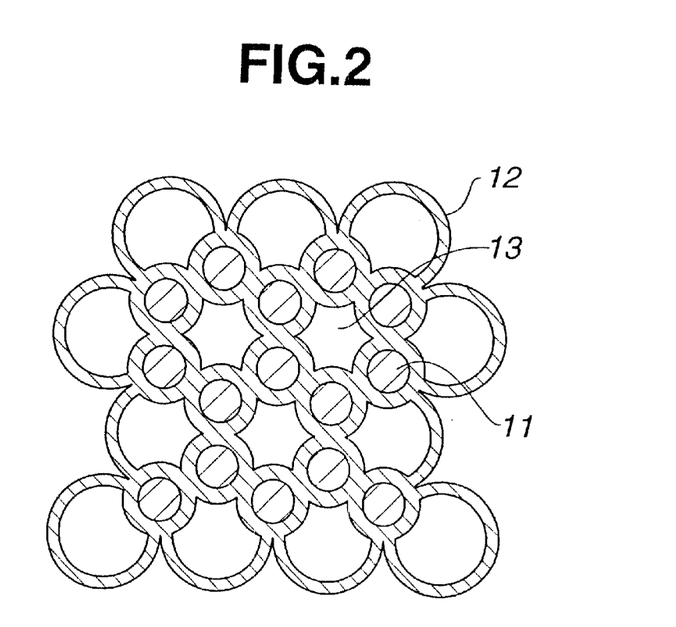
FIG. 2 is a schematic top view of a second implementation of the invention comprising a photonic crystal configured in two-dimensional periodic structure.

FIG. 1 is a schematic top view of another exemplary implementation of the two-dimensional photonic crystal of the invention. The structure includes a plurality of elongated first elements 11 formed of a first dielectric material. The elements 11 extend in parallel to one another. A longitudinal axis, not shown, extends through the center of each element 11 in the vertical or z-direction. The elements 1 are arranged periodically in two dimensions (x, y) in a plane generally orthogonal to the longitudinal axes extending through the elements 11.

The elements 11 are rods or columns, each having a circular cross sectional profile throughout its longitudinal axis. The elements 11 are periodically arranged to provide a honeycomb lattice.

A second dielectric material 12 surrounds each element 11 and extends between the elements 11. The second dielectric material 2 defines between the elongated elements 1 a plurality of spaces or bores filled with a third dielectric material 13. It should be noted that different shadings is used on FIG. 1 to distinguish between the first and second materials and that the third dielectric material is not shaded.

The permittivity $\epsilon 1$ of the first dielectric material 11 is greater than the permittivity $\epsilon 2$ of the second dielectric material 12 and the permittivity $\epsilon 3$ of the third dielectric material 13. The permittivity $\epsilon 2$ of the second dielectric material 12 is greater than the permittivity $\epsilon 3$ of the third dielectric material 13.

Each element 11 of the photonic crystal of FIG. 2 that was actually made was formed of GaAs having a dielectric constant of 13.1 and has a circular cross sectional profile with a diameter of 0.43 μm. As the second dielectric material 12, $SiO_2$ with a dielectric constant of 3.1 was used. A layer of $SiO_2$ with a thickness 0.1 μm covered the elements 11. The third dielectric material 13 was air having a dielectric constant of 1.

The elements 11 of GaAs was arranged in the two-dimensional honeycomb lattice pattern having a lattice constant a of 1.55 μm to produce a complete PBG to forbid the propagation of incident of light with a wavelength of 1.55 μm.

[Third Implementation of the Invention]

The photonic crystal shown in FIG. 2 can be fabricated on a portion of a homogeneous or uniform dielectric substrate by one of several methods. One exemplary method involves the use of etching technique to form dielectric columns in honeycomb periodic pattern and the use of deposition to form dielectric film around the columns.

Figure 3A:
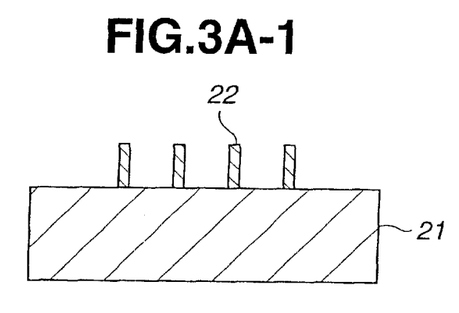

FIGS. 3A-1 to 3C-1 are schematic cross-sectional illustrations showing fabrication steps. FIGS. 3A-2 to 3C-2 are schematic top views showing the fabrication steps of FIGS. 3A-1 to 3C-1, respectively.

Figure 3A:
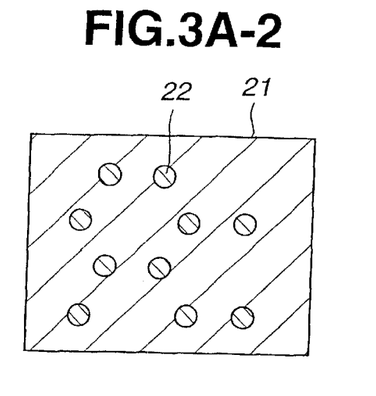

Referring to FIGS. 3A-1 and 3A-2, a dielectric substrate 21 is covered on one face with an etching mask 22. The etching mask 22 contains a two-dimensional array of geometric figures of the size, spacing and periodicity required for the desired complete PBG. If circular rods or columns of high dielectric material are to be formed in the substrate, the geometric figures are circles that are opaque to an etchant used to selectively eradicate the high dielectric substrate material, and the remainder of the mask is transparent to the etchant. Photolithography or electron beam lithography may be employed to pattern the two-dimensional array of geometric figures.

If the geometric figures of a patterned resist on the substrate are positively defined, metal or dielectric is deposited, by vapor deposition, on the substrate to fill the apertures of the geometric figures and the resist is removed. The resulting two-dimensional array of deposited metal or dielectric figures defines the etching mask 22.

If the geometric figures of a patterned resist are negatively defined, it can be directly used as the etching mask 22. Prior to patterning such resist, one or more thin layers, each being formed of metal or dielectric, may be formed on the face of the substrate. In this case, the resist is formed on the thin layer on the substrate and used as a mask for the subsequent dry etching to transfer the pattern to the thin layer on the substrate. The transferred pattern within the thin layer of the substrate also defines the etching mask 22 in cooperation with the resist. If desired, the resist may be removed. Using the transferred pattern from the resist as the mask for the subsequent etching is widely employed technique to widen an etch selectivity between substrate and mask.

Figure 3B:
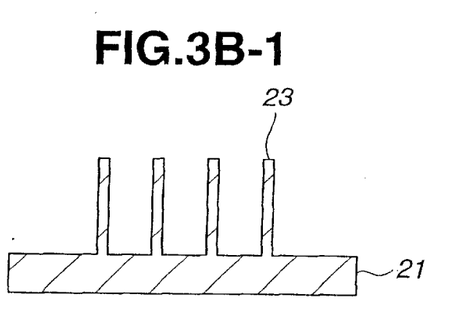
Figure 3B:
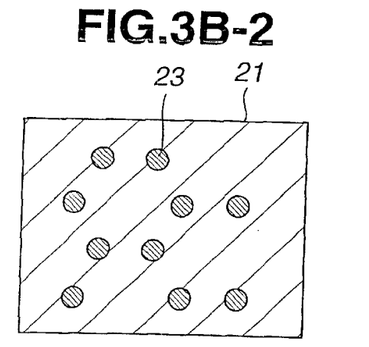

The pattern of the etching mask 22 is transferred to the underlying substrate 21 by using a dry etcher, and vertical channels of the desired shape are created in the substrate 21 as shown in FIGS. 3B-1 and 3B-2. The resulting array of elements defines the two-dimensional periodicity of the honeycomb lattice structure. If the etching mask 22 contains metal, it must be removed. If the etching mask 22 contains dielectric material only, the etching mask 22 may not be removed.

Figure 3C:
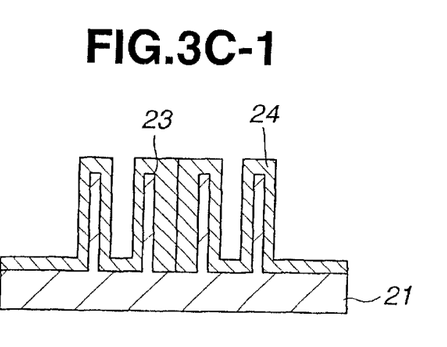
Figure 3C:
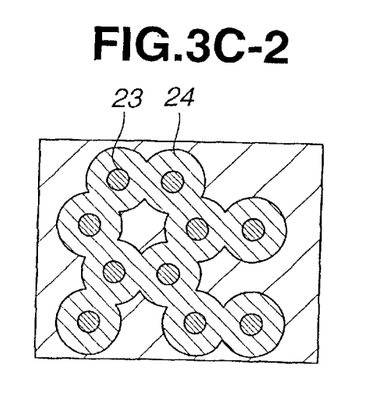

After etching, the substrate 21 with the resulting array is cleaned. Then, a dielectric layer 24 of a dielectric material with a less permittivity than the substrate 21 is formed on the substrate 21. The dielectric layer 24 has a thickness such that the dielectric layer 24 extends between the adjacent dielectric rods or columns 23. This arrangement makes contribution to increased strength of the photonic crystal of the invention.

The substrate 21 was a homogeneous substrate of GaAs with a permittivity of 13.1. This substrate 21 was non-doped to suppress absorption of light to a sufficiently low level. The substrate 21 was coated with a PMMA resist by a spin coater. The thickness of the PMMA resist was 0.2 μm. Then, the resist on the substrate 21 was baked at temperature 80° C. for 15 minutes. An electron beam lithography system was used to print on the baked resist a two-dimensional array of geometric figures of the size, spacing and periodicity required for the desired honeycomb lattice with a lattice constant of 1.55 μm. The geometric figures of the resist were circular apertures. An electron beam evaporation system was used to deposit Ni on the resist to a depth 50 nm. Then, the substrate 21 is immersed into organic solvent for removing Ni from the surface of the resist, forming an array of geometric figures of Ni.

Subsequently, using the array of Ni geometric figures as a mask, the substrate was etched within an electron cyclotron resonance (ECR) plasma etching system. Chlorine gas plasma under pressure 13.3 mPa was used as an etchant. The bias voltage applied to the substrate was 70 V. The temperature of the substrate was cooled and maintained at room temperature. After the etching was completed, the array of Ni geometric figures was removed from the face of the substrate and the substrate was cleaned by hydrochloride and water. Subsequently, a thermal CVD system was used to deposit $SiO_2$ to a depth 0.1 μm on the substrate.

If desired, $SiO_2$ on the upper end of each of dielectric rods or columns 23 and a portion of $SiO_2$ within spaces between the rods or columns 23 may be removed by exposing the substrate to anisotropic etching within a parallel plate dry etching system. An etchant was $CF_4$ gas plasma under pressure 0.4 mPa. The bias voltage applied to the substrate was about 30 V. If desired, other etching system such as a photo etching system may be used instead of the above-mentioned parallel plate dry etching system.

The resulting photonic crystal exhibited increased structural strength because $SiO_2$ interconnect the dielectric rods or columns 23.

[Fourth Implementation of the Invention]

The photonic crystal shown in FIG. 1 can be fabricated on a portion of a homogeneous or uniform dielectric substrate by one of several methods. One exemplary method involves the use of etching technique to form bores periodic triangular pattern and the use of oxidation to form dielectric columns in periodic honeycomb pattern.

Figure 4A:
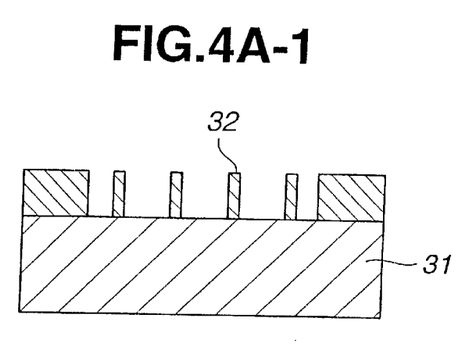

FIGS. 4A-1 to 4C-1 are schematic cross-sectional illustrations showing fabrication steps. FIGS. 4A-2 to 4C-2 are schematic top views showing the fabrication steps of FIGS. 4A-1 to 4C-1, respectively.

Figure 4A:
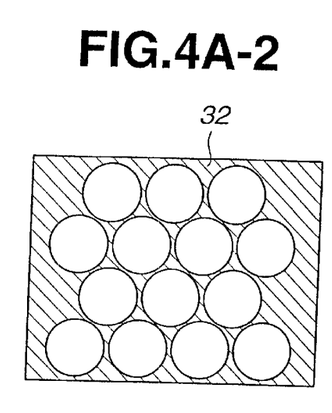

Referring to FIGS. 4A-1 and 4A-2, a dielectric substrate 31 is covered on one face with an etching mask 32. The etching mask 32 contains a two-dimensional array of geometric figures of the size, spacing and periodicity required for a triangular lattice with a lattice constant a that is equal to a lattice constant of a desired honeycomb lattice. If circular holes or bore are to be formed in the substrate, the geometric figures of the etching mask 32 are circles that are transparent to an etchant used to selectively eradicate the high dielectric substrate material, and the remainder of the mask is opaque to the etchant. Photolithography may be employed to pattern the two-dimensional array of such geometric figures.

Figure 4B:
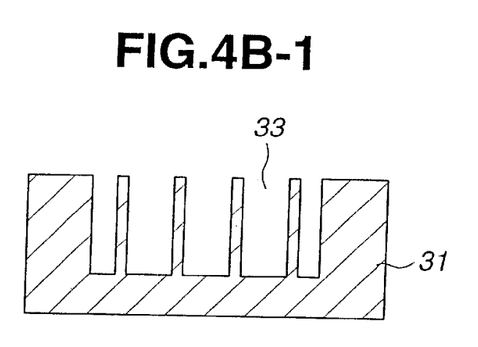
Figure 4B:
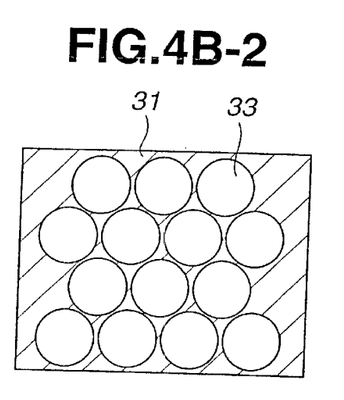

The pattern of the etching mask 32 is transferred to the underlying substrate by using a dry etcher, and vertical channels of the desired shape, i.e., bores 33, are created in the substrate 31 as shown in FIGS. 4B-1 and 4B-2. The resulting array of elements defines the two-dimensional periodicity of bores 33 in triangular lattice structure.

Figure 4C:
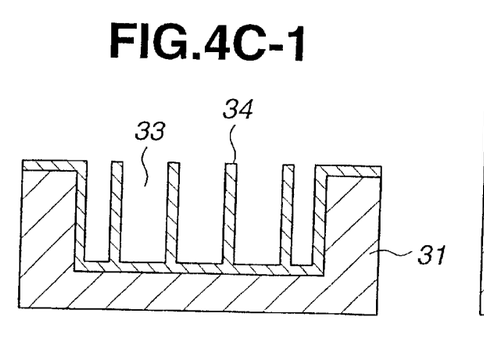
Figure 4C:
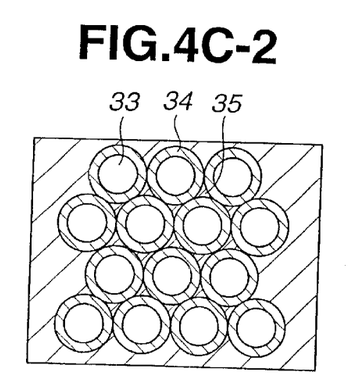

After etching, the substrate 31 with the resulting array is cleaned. Then, the substrate 31 is oxidized. Oxidation progresses inwards of the substrate from a cylindrical wall defining each bore 33 until portions of the substrate dielectric material on line segments, each interconnecting the centers of the adjacent two bores 33, are completely oxidized. Oxidation has progressed inwards from the wall defining each bore 33 forms an oxide layer 34 as shown in FIGS. 4C-1 and 4C-2. Oxidation causes the permittivity of the dielectric material of the substrate 31 to drop. Thus, the oxide layer 34 has a permittivity less than the dielectric material of the substrate 31. The thickness of each oxide layer 34 is determined such that the three oxide layers 34 extending toward each other from three bores 33 that are in a single triangular lattice cooperate with each other to leave a generally triangular column of the substrate dielectric material non-oxidized. The resulting array of these triangular dielectric columns defines the two-dimensional array of dielectric columns 35 in the desired honeycomb lattice, as shown in FIG. 1.

The thickness of each oxide layer 34 may be slightly less than the above-mentioned thickness at which portions of the substrate dielectric material on line segments, each interconnecting the centers of the adjacent two bores 33, are completely oxidized as long as each of dielectric columns 35 is substantially surrounded by the three oxide layers 34. In this case, the same structure might be fabricated by forming an oxide layer on a cylindrical wall defining each bore 33. But, this method requires etching bores in triangular lattice with a very thin separating wall between the adjacent two of the bores. Thus, if a photonic crystal with a very thin separating wall between the adjacent two of bores in triangular lattice is to be formed, the method according to the fourth implementation of the invention is advantageous because the oxidation inwards from the bore defining walls allows etching bores 33 leaving sufficiently thick separating walls between them.

The substrate 31 was a homogeneous substrate of Si with a permittivity of 11.9. This substrate 31 was non-doped to suppress absorption of light to a sufficiently low level. The substrate 31 was coated with a photo resist by a spin coater. The thickness of the photo resist was 1 μm. Then, the photo resist on the substrate 31 was baked at temperature 80° C. for 15 minutes. An i-line stepper was used to print in the baked photo resist a two-dimensional array of geometric figures of the size, spacing and periodicity required for the desired triangular lattice with a lattice constant of 1.55 μm. The geometric figures of the photo resist were circular apertures with a diameter of 1.40 μm.

Subsequently, using the patterned photo resist as a mask, an ECR plasma etching system was used to etch the substrate. Chlorine gas plasma under pressure 13.3 mPa was used as an etchant. The bias voltage applied to the substrate was 70 V. The temperature of the substrate was cooled and maintained at room temperature. After the etching was completed, the photo resist was removed from the face of the substrate by cleaning with organic solvent. Subsequently, a thermal oxidation furnace was used to oxide the substrate inwards to a depth 0.1 μm from a cylindrical wall defining each bore 33 to form a layer of $SiO_2$. The temperature within the furnace was 950° C.

The three oxide layers 34 extending toward each other from three bores 33 that are in a single triangular lattice cooperate with each other to leave a generally triangular column of the substrate dielectric material non-oxidized. The resulting array of these triangular dielectric columns defines the two-dimensional array of dielectric columns 35 in the desired honeycomb lattice, as shown in FIG. 1.

If desired, $SiO_2$ on the upper end of each of dielectric columns 35 and a portion of $SiO_2$ within spaces between the columns 35 may be removed by exposing the substrate to anisotropic etching within a parallel plate dry etching system. An etchant was $CF_4$ gas plasma under pressure 0.4 mPa. The bias voltage applied to the substrate was about 30 V. If the structure can withstand stress, hydrofluoric acid may be used to remove a portion of $SiO_2$.

The preceding description on the fourth implementation clearly indicates that forming or patterning a resist for the subsequent etching bores in triangular lattice does not require excessive accuracy. In the third embodiment, a resist for the subsequent etching elements in honeycomb lattice requires high accuracy to form.

If dielectric elements in honeycomb lattice with a lattice constant 1.55 μm are to be formed, the distance between centers of the nearest two dielectric elements is 0.89 μm. According to the third implementation of the invention, a resist must include geometric figures in honeycomb lattice with their centers separated one after another by a distance 0.89 m. In this case, what is needed to form the geometric figures on the resist is an electron beam lithography system rather than an i-line or g-line stepper. According to the fourth implementation of the invention, a resist must include geometric figures in triangular lattice with their centers separated one after another by a distance 1.55 μm. In this case, an i-line or g-line stepper can be used in forming the geometric figures. It is known that although the stepper is inferior to the electron beam lithography in terms of resolution of image, the stepper is better for mass production than the electron beam lithography when comparing them in terms of throughput.

The dielectric substrate 31 may be made of GaAs or appropriate one of chemical compounds of elements belonging to III-V groups. However, the use of Si as the material of dielectric substrate 31 is advantageous because the fully developed and stable thermal oxidation technique of Si can be used.

According to the fourth implementation of the invention, the thickness of oxide layer determines dimensions of each dielectric elongated element along the plane orthogonal (x-y plane) to the longitudinal axes of the dielectric elements. According to the thermal oxidation technique, it is quite easy to control the thickness of oxide layer. Thus, what is needed is to alter the thickness of oxide layer only to tune a photonic crystal within a range of frequencies over PBG.

[Fifth Implementation of the Invention]

Figure 5:
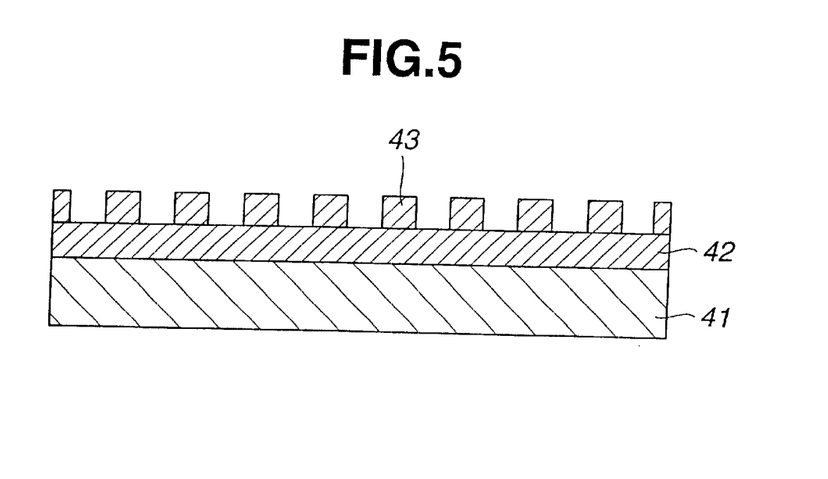
FIG. 5 is a schematic cross sectional illustration of a fifth implementation of the invention comprising, on a multiple layered substrate, plural of photonic crystals.

FIG. 5 is a schematic cross section illustrating the fifth implementation of the invention. According to the fifth implementation, a photonic crystal is formed in a multiple layer substrate. In FIG. 5, the reference numeral 41 designates a substrate. The reference numeral 42 designates a dielectric layer formed of a dielectric material with a low permittivity. The reference numeral 43 designates a two-dimensional photonic crystal.

An example of the illustrated structure can be provided by forming a photonic crystal of the first or second implementation in an Si layer of a SOI (Si on Insulator; Si/SiO$_2$/Si) substrate if the SOI substrate is to be used as the multiple layer substrate.

In this case, the two-dimensional photonic crystal 43 is interposed between the dielectric layer 42 with low permittivity and air with low permittivity. This structure is analogous to a slab waveguide and restrains the propagation of light in a vertical direction parallel to the longitudinal axes of dielectric elements in honeycomb lattice. Thus, the proipagation of light into the low dielectric layer 42 and/or air is suppressed.

While the present invention has been particularly described, in conjunction with a preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method of fabricating a photonic crystal, comprising:

providing a substrate;

forming within said substrate a plurality of elongated elements of a first dielectric material in a two-dimensional periodic honeycomb lattice;

forming a layer of a second dielectric material over said substrate to a thickness such that said second dielectric material continuously extend between said plurality of elongated elements, said second dielectric material having permittivity less than permittivity of said first dielectric material.

2. A method of fabricating a photonic crystal, comprising:

providing a dielectric substrate;

oxidizing said substrate inwardly to define a plurality of elongated elements within said substrate; and controlling the depth of oxidation of said substrate to determine dimensions of each of said plurality of elongated elements.

3. A method of fabricating a photonic crystal, comprising;

providing a substrate;

forming elongated bores within said substrate in triangular lattice; and oxidizing said substrate inwardly to define a plurality of elongated elements within said substrate until a portion of said substrate on a line segment interconnecting centers of the adjacent two of said bores is completely oxidized.

4. The method as claimed in claim 1, wherein said dielectric substrate is made of Si.

5. The method as claimed in claim 2, wherein said dielectric substrate is made of Si.

6. The method as claimed in claim 3, wherein said dielectric substrate is made of Si.

* * * * *